//united States Patent Office 3,445,200
Patented May 20, 1969

3,445,200
PROCESS FOR THE DISPROPORTIONATION OF CHLOROSILANES
Jacques Paul Dunogues, Lyon, Marcel Joseph Celestin Lefort, Caluire, and Robert Raphael Puthet, Lyon, France, assignors to Rhone-Poulenc S.A., Paris, France, a French body corporate
No Drawing. Filed Mar. 18, 1966, Ser. No. 535,311
Claims priority, application France, Mar. 19, 1965, 9,996
Int. Cl. C01b 33/08, 33/04; C07f 7/12
U.S. Cl. 23—366    9 Claims

ABSTRACT OF THE DISCLOSURE

Tris(tertiary amino)phosphine oxides are effective catalysts in the diproportionation of chlorohydrogenosilanes.

---

The present invention relates to the disproportionation of chlorohydrogenosilanes.

Of the compounds commonly referred to as chlorosilanes, those which possess one hydrogen atom directly attached to the silicon atom have for a long time been very widely employed in the silicones industry. The method of producing them industrially consists in reacting an alkyl or aryl halide with silicon, for example in the presence of cuprous chloride.

The importance of silanes having more than one hydrogen atom attached to a single silicon atom has considerably increased in the last few years because of the properties which they impart to organosilicon polymers made using them. It is therefore desirable to be able to obtain such silanes in good yields from chlorosilanes on an industrial scale.

To this end, attempts have already been made to effect the disproportionation of chloromonohydrogenosilanes by heating them in the presence of various catalysts. The catalysts employed have been the halides of aluminium, boron, zinc and iron. These catalysts are convenient to use, but the proportion of dihydrogenosilane formed is low and in addition the unconverted chlorosilane starting material is only partially recoverable.

It has also been proposed to carry out this disproportionation reaction in the presence of an organic catalyst such as a nitrile, heterocyclic amine, amino-triazine or dialkylcyanamide. However, some of these compounds are not very easy to obtain. Moreover, the activity of these organic catalysts is dependant on the simultaneous use of a promoter or on a previous activation step. This activation may be carried out by treating the catalyst with a chlorosilane or with a halide, e.g. of boron, titanium, aluminium, zinc, tin or iron.

It has now been found that the disproportionation of chlorohydrogenosilanes may be carried out more advantageously if the catalyst used is a tris(tertiary amino) phosphine oxide. The process of the invention comprises contacting a chlorohydrogenosilane with a tris(tertiary amino)phosphine oxide at a temperature below 150° C., and generally from 0° C. to 120° C.

The disproportionation reaction may be represented as follows:

$2R_{4-m-n}SiCl_mH_n \rightleftharpoons R_{4-m-n}SiCl_{m-1}H_{n+1}$
$+ R_{4-m-n}SiCl_{m+1}H_{n-1}$ where $m$ and $n$ are each 1, 2 or 3, their sum 4 or less, and R represents an organic radical, such as an alkyl, alkenyl, cycloalkyl, cycloalkenyl, aryl or aralkyl radical optionally substituted by groupings which do not interfere with the disproportionation. More especially, R may be alkyl of 1 to 4 carbon atoms, alkenyl of 2 to 4 carbon atoms, more particularly vinyl or allyl, a saturated or unsaturated cycloaliphatic radical of 5 or 6 ring carbon atoms, such as cyclopentyl, cyclohexyl, cyclohexenyl, methylcyclopentyl, or methylcyclohexyl, aryl such as phenyl and (lower alkyl)phenyl, and aralkyl such as benzyl. These various radicals may be unsubstituted or substituted by one or more atoms or groups which do not interfere with, or take part in, the disproportionation. Examples of such substituents are halogen atoms such as fluorine or chlorine atoms. The new process is especially valuable when applied to compounds in which R is alkyl of 1 to 4 carbon atoms or phenyl.

The tris(tertiary amino)phosphine oxide may be a compound of the formula:

$$OP(NR^1R^2)_3$$

in which $R^1$ and $R^2$ represent monovalent hydrocarbon radicals which are unsubstituted or substituted by one or more atoms or groups which do not interfere with, or take part in, the disproportionation. $R^1$ and $R^2$ may be the same or different, and in addition two of these radicals may be joined to form a divalent radical, and forming either a monoheterocyclic radical with a nitrogen atom or a heterocycle with the phosphorus atom and two of the nitrogen atoms attached thereto. The individual groupings $NR^1R^2$ may all be the same or all different, or two of them may be the same and different from the third. $R^1$ and $R^2$ may, in general, be chosen from the same group as the R radicals. When $R^1$ and $R^2$ form a heterocycle with the nitrogen atom, this heterocycle may be mononuclear with 5 or 6 ring members and may contain a second heteroatom, e.g. oxygen. Moreover, this heterocycle may optionally have alkyl substituents such as methyl, ethyl or propyl. The residue $NR^1R^2$ may thus be, for example, a 1-pyrollidinyl, piperidino, morpholino, monomethyl-piperidino, dimethylpiperidino, diethylpiperidino or 4-methyl-1-piperazinyl residue. When two of the radicals $R^1$ and $R^2$ form a heterocycle with the phosphorus atom and two of the nitrogen atoms attached thereto, the divalent radical which they represent may be a polymethylene or phenylene radical, and these radicals may optionally have alkyl substituents such as methyl, ethyl or propyl. It is generally most convenient to use as catalyst a compound in which $R^1$ and $R^2$ are both lower alkyl, i.e. alkyl of 1 to 4 carbon atoms, especially tris(dimethyl amino)phosphine oxide.

These triaminophosphine oxides are products which can readily be obtained from phosphorus oxychloride and amines and their preparation is clearly described in the literature, for example in Houben-Weyl's "Methoden der Organischen Chemie." As already stated tris(dimethylamino)phosphine oxide, which is commercially available is particularly convenient to use.

The quantity of triaminophosphine oxide employed in the new process may vary within fairly wide limits, for example between 0.1% and 30% by weight based on the weight of the chlorohydrogenosilane to be disproportionated. Proportions between 0.5% and 15% are generally suitable. The triaminophosphine oxide can usually be recovered at the end of the operation substantially quantitatively. When the silane products and unreacted starting material have been removed, e.g. by distillation, the catalyst may be isolated by any known method, for example by distillation or by crystallisation in the case of a compound solid at ambient temperature.

As shown in the equation given above, the disproportionation reaction is in equilibrium with the reverse reaction. The composition of the reaction mixture thus depends upon the equilibrium conditions, and it is advantageous to remove one of the products of the disproportionation reaction as it is formed, in order to cause the disproportionation to proceed to completion. This is often conveniently done by continuously removing the more volatile product of the disproportionation by practical distillation from the reaction mixture.

Although the reaction is generally carried out at atmospheric pressure, it is possible to work below this pressure in some cases, more particularly when the silane which it is desired to eliminate in the course of the reaction has a boiling point higher than the reaction temperature, i.e. 150° C. The reaction mixture may also in appropriate cases be heated in an autoclave.

It is possible to work with or without a diluent. Suitable diluents are liquid organic compounds which are inert under the reaction conditions and which, taking into account the other elements of the medium, remain completely liquid at the reaction temperature. Examples of such diluents are aromatic hydrocarbons, and in particular the alkyl and/or chloro derivatives of benzene, such as toluene, xylenes, cumene, monochlorobenzene, dichlorobenzenes and chlorotoluenes. The quantity of diluent employed is not critical and depends to a very large extent upon the operating conditions.

The process may be carried out continuously or discontinuously.

In practice, the following procedure is often conveniently adopted. The mixture of triaminophosphine oxide and chlorohydrogenosilane, optionally containing a diluent, is brought to the desired temperature in order to eliminate by distillation as it is formed the more volatile disproportionation product. When the operation is continuously carried out, the less volatile disproportionation product may be separated from the liquid remaining in the reaction vessel and the unconverted starting chlorohydrogenosilane simultaneously recycled.

The triaminophosphine oxide catalyst may be isolated at the end of the operation by any appropriate known purifying means.

The following examples illustrate the invention.

Example 1

The apparatus employed is a 2-litre round-bottomed flask provided with a dropping funnel, a thermometer tube, a neck for the introduction of nitrogen and a distillation column connected to a condensing system. The column (height: 140 cm., internal diameter: 4 cm.) is packed with glass rings 0.5 cm. in diameter and provided with an evacuated external jacket. The condensing system is formed of an analyser, an ordinary condenser and a double-jacketed receiver. Each of these elements is cooled by a current of acetone maintained at −20° C. The receiver is conected to a bubble counter through a drying column.

1260 g. of methyldichlorosilane are introduced into the round-bottomed flask and, when the apparatus has been purged with nitrogen, 190 g. of tris(dimethylamino)phosphine oxide are added in five minutes. The mixture is then brought to boiling point and the monomethylmonochlorosilane (B.P.=7–8° C. mm. Hg) is distilled as it is formed. At the end of 7 hours, 388 g. of a liquid fraction containing 384 g. of monomethylmonochlorosilane and 4 g. of methyldichlorosilane have been collected.

After cooling, the distillation is continued under a vacuum of 200 mm. Hg, and 52 g. of unconverted methyldichlorosilane and 781 g. of methyltrichlorosilane are collected.

Example 2

A 1-litre round-bottomed flask is employed, into which 575 g. of methyldichlorosilane are introduced, the remainder of the apparatus being the same as in Example 1. When the apparatus has been purged with nitrogen, 58 g. of tris(dimethylamino)phosphine oxide are introduced into the flask in a few minutes, and the procedure described in Example 1 is followed. At the end of 7 hours, a liquid fraction has been collected weighing 172 g. and containing 167 g. of monomethylmonochlorosilane and 5 g. of methyldichlorosilane. By distillation under a vacuum of 200 mm. Hg, 72 g. of unconverted methyldichlorosilane and 301 g. of methyltrichlorosilane are isolated from the residue in the distillation flask. The residue is then fractionally distilled under a higher vacuum, and 52.5 g. of tris(dimethylamino)phosphine oxide, B.P.=80° C./3 mm. Hg, are recovered.

Example 3

An apparatus identical to that described in Example 1 is used. 1000 g. of trichlorosilane are introduced into the flask and stirred with a magnetic stirrer, while 150 g. tris(dimethylamino)phosphine oxide are introduced in 10 minutes. The mixture is then brought to boiling point, and at the end of 7½ hours, 218 g. of dichlorosilane have been distilled off. By distillation of the residue under 200 mm. Hg, 346 g. of unconverted trichlorosilane are recovered Example 4

The procedure of Example 3 is followed with 225 g. of trichlorosilane and 23 g. of tris(dimethylamino)phosphine oxide. After operation for 7 hours, 45.6 g. of dichlorosilane have been obtained.

Example 5

The disproportionation of methyldichlorosilane is carried out continuously in a 3-litre round-bottomed flask provided with a stirrer and a tube for the introduction of the reactants. In addition, a distillation column (height: 165 cm., diameter: 3.8 cm.) containing packing elements of the Multiknit brand and having an evacuated external jacket, is mounted on the reactor, and is connected to a double-jacketed analyser connected to a receiver through an ordinary condenser. The receiver is cooled by a fluid maintained at −20° C. The flask is also provided with a tube for the discharge of the liquid phase, at a level corresponding to that of the desired permanent liquid phase volume and leading to an instantaneous evaporator, which is itself connected to a distillation column.

The apparatus is purged with nitrogen, and the flask is initially charged with 800 g. of orthodichlorobenzene and 350 g. of tris(dimethylamino)phosphine oxide and heated to 45–50° C. Methyldichlorosilane is passed into this mixture at a rate of from 500 to 600 g. per hour. The monomethylmonochlorosilane is vapourised as it is formed and leaves the apparatus by way of the distillation column mounted on the flask. Simultaneously, the contents of the flask gradually overflow into the instantaneous evaporator, which is heated at 100° C. and which volatilises the methyltrichlorosilane formed and the unconverted methyldichlorosilane, while the nonvapourised solvent and catalyst return to the reactor. The portion vapourised in the evaporator passes to the attached fractional distillation column, so that it is possible to separate the methyltrichlorosilane which is removed and the methyldichlorosilane which is recycled to the flask.

After operation for 100 hours, 51.5 kg. of methyldichlorosilane have been introduced into the reactor, and 13.970 kg. of monomethylmonochlorosilane and 34.4 kg. of a mixture of 89% of methyltrichlorosilane and 11% of unconverted methyldichlorosilane have been collected.

Example 6

The apparatus used is similar to that of Example 1, but the capacity of the flask is only 1 litre. 550 cc. of anhydrous chlorobenzene and 27 g. of trimorpholinophosphine oxide are introduced into the flask, and, when the apparatus has been purged with dry nitrogen, the contents of the flask are heated to 90° C. and 282 g. (2.08 mol.) of trichlorosilane are rapidly introduced. The temperature falls to 77° C. The contents of the flask are then heated under reflux and the procedure described in Example 1 is followed.

At the end of 7 hours, the temperature within the flask has risen from 77° to 92° C. and a liquid fraction containing 50 g. of dichlorosilane and 4.5 g. of trichlorosilane has been collected. By distillation of the residue in the flask under atmospheric pressure, a second fraction containing 6.5 g. of dichlorosilane, 114.5 g. of trichlorosilane and 68 g. of silicon tetrachloride is collected. The dichlorosilane yield, based on the unrecovered trichlorosilane, is thus 94%.

Example 7

345 g. (3 mole.) of methyldichlorosilane are introduced into a 500 cc. round-bottomed flask, the remainder of the apparatus being identical with that of Example 1. When the apparatus has been purged with dry nitrogen, 30 g. of tris(diethylamino)phosphine oxide are introduced through the dropping funnel and the procedure of Example 1 is followed. At the end of 7 hours, a liquid fraction containing 68.5 g. of methylmonochlorosilane and 1.5 g. of methyldichlorosilane has been collected. By distillation of the residue in the flask under atmospheric pressure, 30 g. of a mixture of equal parts of methylmonochlorosilane and methyldichlorosilane are collected. 200 cc. of benzene are then added to the flask and the distillation is continued. A third fraction containing 79.5 g. of methyldichlorosilane and 151 g. of methyltrichlorosilane is obtained. The methylmonochlorosilane yield, based on the methyldichlorosilane used up, is 96%.

Example 8

The apparatus employed is similar to that of Example 1 except that the flask has a volume of 250 cc. and that a column having a height of 40 cm. and an internal diameter of 2 cm. with a packing of 3 mm. glass rings is employed. The flask is charged with 118 g. (0.75 ml.) of butyldichlorosilane, and the apparatus is purged with dry nitrogen. When 6 g. of tris(dimethylamino)-phosphine oxide have been rapidly run in, the mixture is heated under reflux with slow distillation. In two hours, a liquid fraction containing 15.5 g. of butylmonochlorosilane and 54.6 g. of butyldichlorosilane is collected. On distillation of the residue in the flask in the presence of orthodichlorobenzene, a fraction containing 2.8 g. of butyldichlorosilane and 39.5 g. of butyltrichlorosilane is recovered. The yield of butylmonochlorosilane, based on the unrecovered butyldichlorosilane, is thus 65%.

Example 9

A one-litre round-bottomed flask surmounted by a column 40 cm. high containing a packing of the Multiknit brand is used. The remainder of the apparatus, which is otherwise identical with that of Example 1, is completed at the outlet by a trap cooled to −70° C. 550 g. of phenyldichlorosilane are introduced into the flask, and, when the apparatus has been purged with dry nitrogen, 55 g. of tris(dimethylamino)phosphine oxide are rapidly run in. The pressure in the apparatus is reduced to 0.3 to 0.7 mm. Hg, and the reaction medium is heated and slowly distilled, while a rapid reflux is kept up at the top of the column. In 18 hours 493 g. of a liquid product are distilled, containing, as determined by chromatography, 94 g. of phenylmonochlorosilane, 256 g. of phenyldichlorosilane and 105 g. of phenyltrichlorosilane. By redistillation of this fraction, phenylmonochlorosilane is isolated, which has B.P.=50–52° C./15 mm. Hg, $n_D^{20}=1.5257$, and $d_4^{20}=1.076$.

We claim:
1. Process for the disproportionation of a chlorohydrogenosilane which comprises contacting the said chlorohydrogenosilane with a tris(tertiary amino)phosphine oxide at a temperature below 150° C.
2. Process according to claim 1 in which the tris(tertiary amino)phosphine oxide is a tris(di-lower alkylamino)phosphine oxide.
3. Process according to claim 2 in which the tris(dialkylamino)phosphine oxide is tris(dimethylamino)phosphine oxide.
4. Process according to claim 1 in which the chlorohydrogenosilane is of the formula:

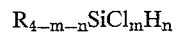

$$R_{4-m-n}SiCl_mH_n$$

where $m$ and $n$ are each 1, 2 or 3, and the sum of $m$ and $n$ is 4 or less, and R is alkyl of 1 to 4 carbon atoms or phenyl.
5. Process according to claim 1 in which the chlorohydrogenosilane is methyldichlorosilane.
6. Process according to claim 1 in which the chlorohydrogenosilane is trichlorosilane.
7. Process according to claim 1 in which the reaction is carried out at 0° to 120° C.
8. Process according to claim 1 in which the more volatile disproportionation product of the chlorohydrogenosilane starting material is removed as vapour from the reaction mixture as it is formed.
9. Process according to claim 8 in which the reaction is carried out continuously by continuously introducing into a reaction zone containing the tris(tertiary amino)-phosphine oxide the chlorohalogenosilane starting material and continuously and separately removing from said zone the disproportionated products, the more volatile product as vapour and the less volatile product in liquid form.

References Cited
UNITED STATES PATENTS

| 2,834,648 | 5/1958 | Bailey et al. | 23—366 |
| 3,044,845 | 7/1962 | Jex et al. | 23—366 |
| 3,128,297 | 4/1964 | Kanner et al. | 23—366 X |
| 3,322,511 | 5/1967 | Weyenberg | 23—366 |

OSCAR R. VERTIZ, Primary Examiner.

G. O. PETERS, Assistant Examiner.

U.S. Cl. X.R.

23—204; 252—426; 260—448.2